US012562163B2

(12) United States Patent　　(10) Patent No.:　US 12,562,163 B2
Shivani et al.　　　　　　　　　　(45) Date of Patent:　　Feb. 24, 2026

(54) BIDIRECTIONAL ASSISTANT FOR DEVELOPMENT PLATFORMS

(71) Applicant: ServiceNow, Inc., Santa Clara, CA (US)

(72) Inventors: Shivani, Hyderabad (IN); Prasanthi PVL, Hyderabad (IN); Suneela Pothula, Hyderabad (IN); Aditya Ramamurthy, Hyderabad (IN); Swaroop Thummalapalli, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 235 days.

(21) Appl. No.: 18/214,082

(22) Filed: Jun. 26, 2023

(65) Prior Publication Data

US 2024/0379100 A1　　Nov. 14, 2024

(51) Int. Cl.
*G10L 15/22*　　　　(2006.01)
*G06F 8/33*　　　　(2018.01)

(52) U.S. Cl.
CPC ................ *G10L 15/22* (2013.01); *G06F 8/33* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 11,651,032 | B2 * | 5/2023 | Jayaraman | ............. G06F 40/30 |
| | | | | 706/12 |
| 11,972,215 | B2 * | 4/2024 | McNamara | ........... G06F 40/211 |
| 12,019,685 | B1 * | 6/2024 | Liu | .......................... G06F 9/453 |
| 12,271,869 | B2 * | 4/2025 | Leaman | .............. G06F 16/2428 |
| 2016/0162333 | A1 * | 6/2016 | Bostick | ................... G06F 3/167 |
| | | | | 718/102 |
| 2019/0378090 | A1 * | 12/2019 | Bastide | ................ G06Q 10/103 |
| 2020/0097258 | A1 * | 3/2020 | Kumar | ...................... G06F 8/34 |
| 2020/0349199 | A1 * | 11/2020 | Jayaraman | ............. G06F 40/49 |
| 2021/0117881 | A1 * | 4/2021 | Sanchez Merchan | ....................... G06Q 10/0633 |
| 2021/0157834 | A1 * | 5/2021 | Sivasubramanian | ........................ G06F 16/686 |
| 2022/0156462 | A1 * | 5/2022 | Mcnamara | ........ G06F 16/90332 |
| 2023/0065223 | A1 * | 3/2023 | Penneru | ................ G06F 40/216 |
| 2023/0086668 | A1 * | 3/2023 | Murakhovs'ka | ...... G06F 16/358 |
| | | | | 704/235 |
| 2023/0139397 | A1 * | 5/2023 | Zhong | ..................... G06F 40/30 |
| | | | | 704/9 |
| 2024/0379100 | A1 * | 11/2024 | Shivani | ................... G10L 15/22 |
| 2024/0412720 | A1 * | 12/2024 | Vasylyev | .......... G06F 16/90332 |
| 2025/0077915 | A1 * | 3/2025 | Polleri | .................... H04L 51/02 |

FOREIGN PATENT DOCUMENTS

| | | | | | |
|---|---|---|---|---|---|
| WO | WO-2021119175 | A1 * | 6/2021 | ........... | G06F 16/355 |
| WO | WO-2023064033 | A1 * | 4/2023 | ............. | H04L 51/02 |

* cited by examiner

*Primary Examiner* — Marcus T Riley

(74) *Attorney, Agent, or Firm* — FLETCHER YODER PC

(57) ABSTRACT

In an embodiments, a process for providing a bidirectional assistant for development platforms includes receiving conversation data that indicates a user requested function, wherein the user requested function is associated with a workflow. The process includes determining, via a machine learning model, computer instructions corresponding to the user requested function. The process includes updating the workflow to include the computer instructions corresponding to the user requested function.

19 Claims, 10 Drawing Sheets

Receive conversation data that indicates a user requested function, wherein the user requested function is associated with a workflow
100

Determine, via a machine learning model, computer instructions corresponding to the user requested function
102

Update the workflow to include the computer instructions corresponding to the user requested function
104

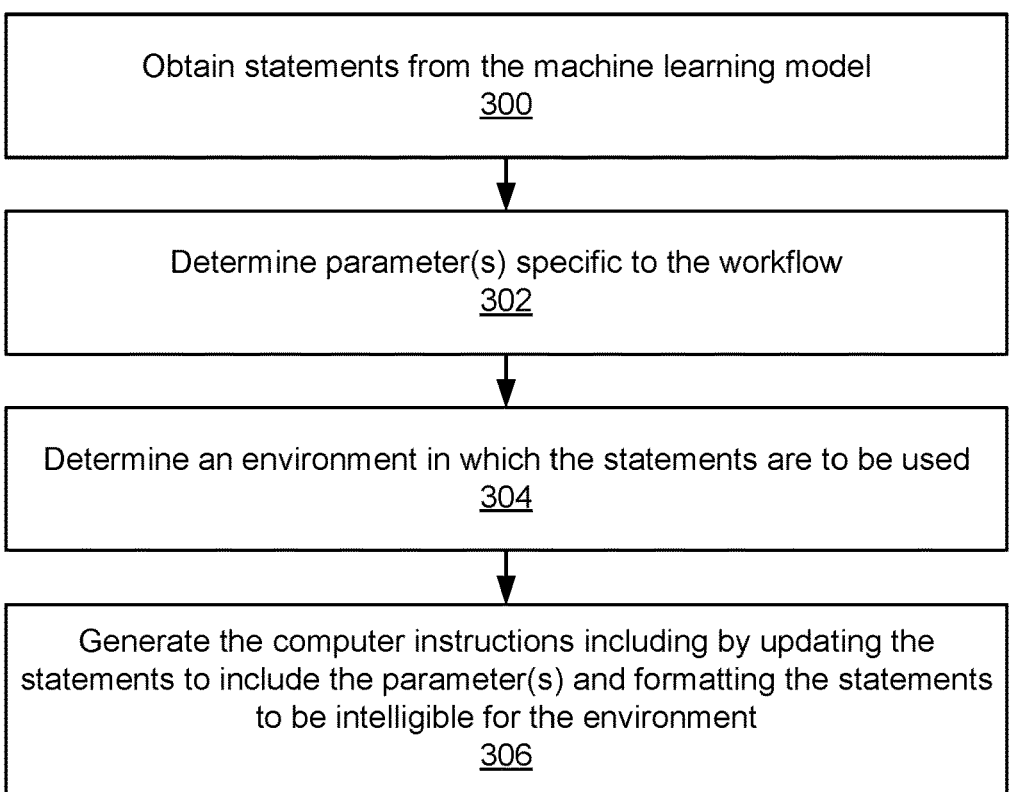

Obtain statements from the machine learning model
300

Determine parameter(s) specific to the workflow
302

Determine an environment in which the statements are to be used
304

Generate the computer instructions including by updating the statements to include the parameter(s) and formatting the statements to be intelligible for the environment
306

FIG. 3

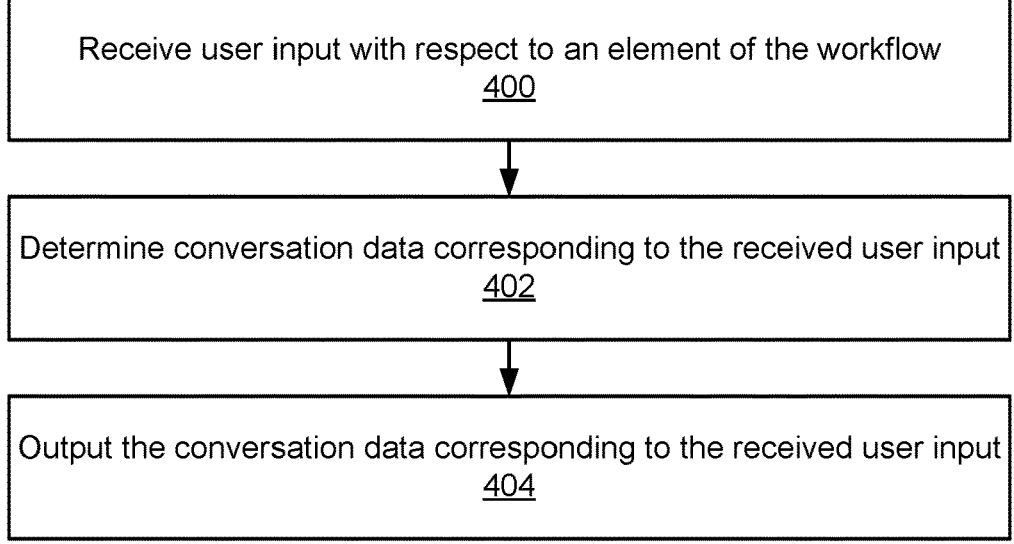

Receive user input with respect to an element of the workflow
400

Determine conversation data corresponding to the received user input
402

Output the conversation data corresponding to the received user input
404

FIG. 4

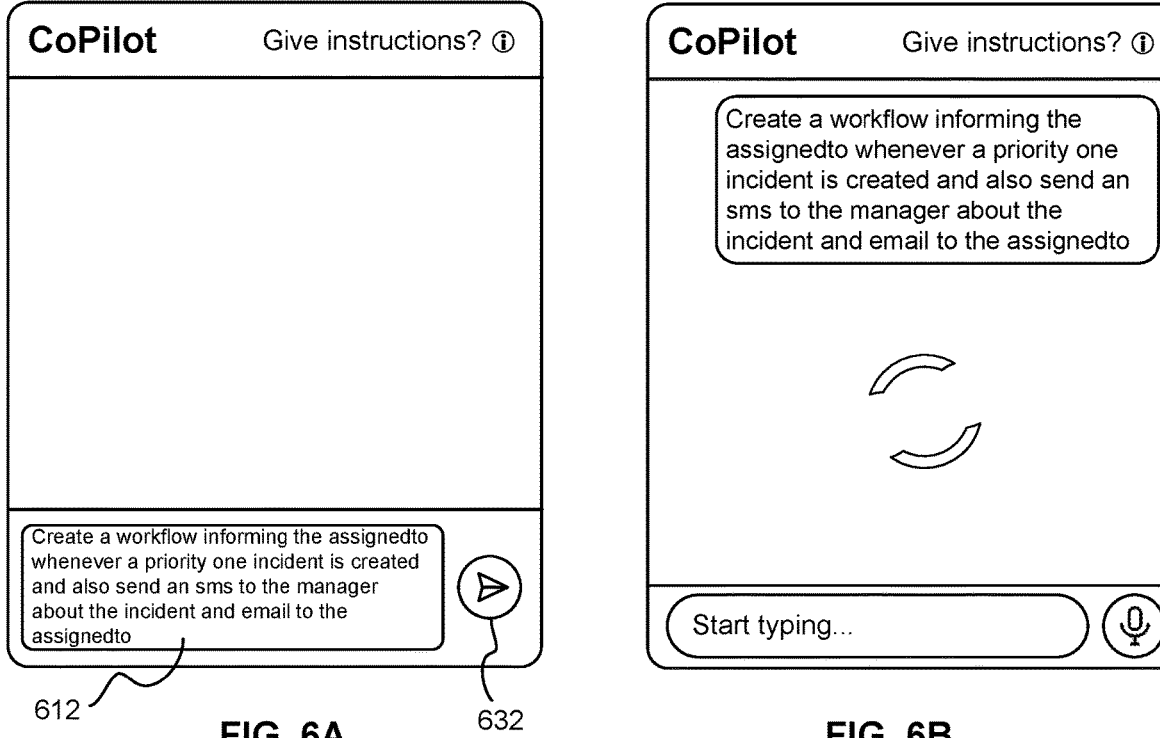
FIG. 6A        FIG. 6B
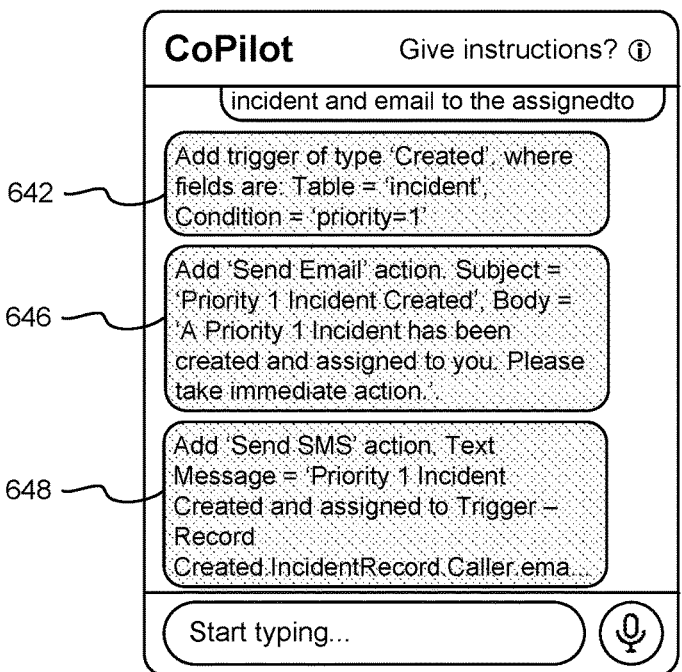
FIG. 6C

BIDIRECTIONAL ASSISTANT FOR DEVELOPMENT PLATFORMS

CROSS REFERENCE TO OTHER APPLICATIONS

This application claims priority to Indian Provisional Patent Application No. 202311033655 entitled BIDIREC-TIONAL CO-PILOT FOR DEVELOPMENT PLAT-FORMS filed May 12, 2023, which is incorporated herein by reference for all purposes.

BACKGROUND OF THE INVENTION

A computer development platform is an environment in which a user can create a computer program via generation of a computer language. For example, a low-code or no-code platform/environment enables a user, who is not necessarily fluent in a computer language, to develop a computer executable function via a workflow. For example, a user can use a graphical user interface to create a workflow by dragging and dropping objects to specify conditions and actions within the workflow. However, existing development platforms include features and objects that require users to have knowledge and skills in order to appropriately use the development platforms. Thus, there is a need to improve the accessibility and ease of use of development platforms.

BRIEF DESCRIPTION OF THE DRAWINGS

Various embodiments of the invention are disclosed in the following detailed description and the accompanying drawings.

FIG. 3 is a flow diagram illustrating an embodiment of a process for customizing computer instructions for a specific environment.

FIG. 4 is a flow diagram illustrating an embodiment of a process for providing bi-directionality in a co-pilot for development platforms.

FIG. 6A is a diagram illustrating an example of a graphical user interface including a bi-directional co-pilot for development platforms in a first state.

FIG. 6B is a diagram illustrating an example of a graphical user interface including a bi-directional co-pilot for development platforms in a second state.

FIG. 6C is a diagram illustrating an example of a graphical user interface including a bi-directional co-pilot for development platforms in a third state.

DETAILED DESCRIPTION

Figure 1:
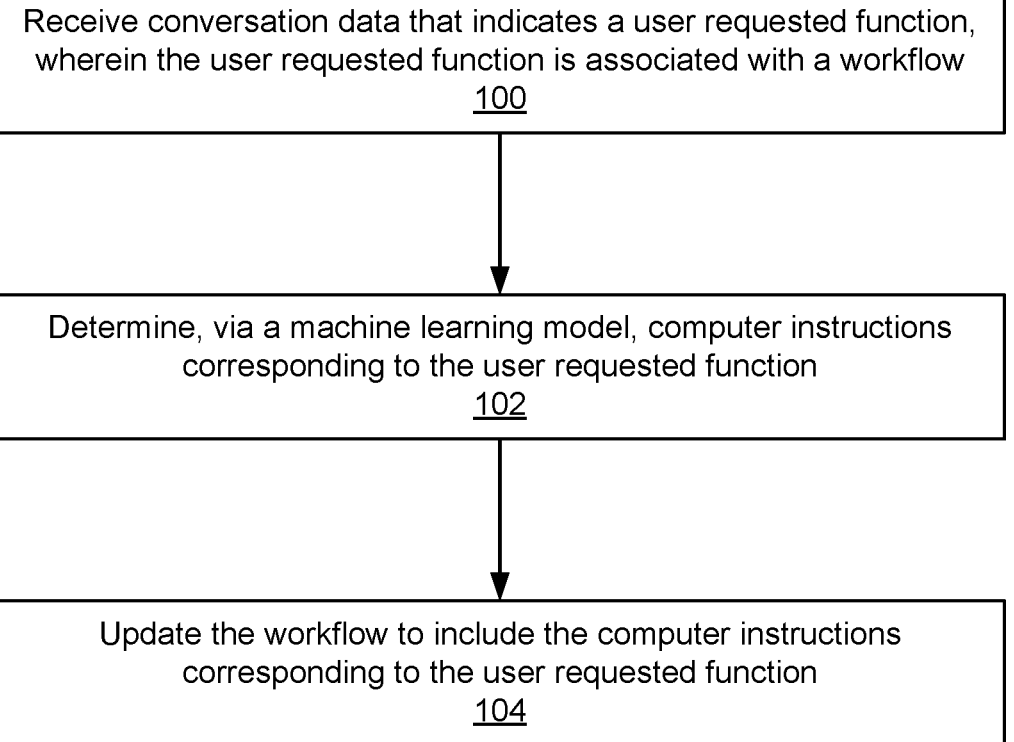
FIG. 1 is a flow diagram illustrating an embodiment of a process for providing a bi-directional co-pilot for development platforms.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An assistant (sometimes called a co-pilot or flow assistant) for a development platform/environment interacts with a user to help realize a desired function, e.g., with respect to a workflow. The workflow is a representation of computer code, and may be digitally managed and presented within a development platform. The co-pilot helps the user to navigate the development platform and/or construct, update, or otherwise manipulate the workflow. The co-pilot provides a hybrid approach to build and edit workflows/code by enabling the user to create or edit a description of a workflow without extensive training on platform or workflow features. The co-pilot may be presented within the development platform (alongside existing features), such as as a pop-up chat window or one or more tiles/cards alongside corresponding portions of the workflow. Although the examples described herein chiefly describe manipulation of a workflow, the co-pilot may be used more generally with other applications or environments as further described herein.

The user can provide natural language input (e.g., voice or text) describing a desired result to the co-pilot to cause the workflow (computer code) to be updated to achieve the desired result. In various embodiments, the co-pilot translates/summarizes computer code (or a representation of the computer code in the workflow) to a natural language description and vice-versa. In other words, based on user input, a workflow is converted to a textual description. The textual description of a workflow can be edited to cause the workflow to be updated. Consequently, the user can easily understand and edit the workflow. The natural language input is converted to a list of one or more computer instructions using a machine learning model such as a trained language model (e.g., a large language model). The computer instructions can be processed to correct errors or adapt the instructions for a particular scenario such as determining a table name for a specific instance. A graphical representation of each instruction (e.g., a tile/card) in the list of computer instruction(s) is determined and the workflow is updated to include the graphical representations. In various embodiments, the co-pilot is bidirectional, dynamically updating a workflow or a natural language description of the workflow so that the workflow and corresponding natural language description reflect each other.

In various embodiments, a process for providing a bi-directional co-pilot for development platforms includes receiving conversation data that indicates a user requested function, where the user requested function is associated with a workflow. The process includes determining, via a machine learning model, computer instructions corresponding to the user requested function. The process includes updating the workflow to include the computer instructions corresponding to the user requested function.

FIG. 1 is a flow diagram illustrating an embodiment of a process for providing a bi-directional co-pilot for development platforms. This process may be implemented on a processor such as the co-pilot 200 shown in FIG. 2 or the processor 1102 shown in FIG. 11.

In the example shown, the process begins by receiving conversation data that indicates a user requested function, wherein the user requested function is associated with a workflow (100). The workflow may be digitally managed, e.g., via a platform or environment such as a workflow designer. An example GUI of a workflow designer is further described with respect to FIG. 7. The user requested function includes a desired result associated with the workflow.

In various embodiments, the conversation data includes a natural language input. For example, the co-pilot accepts text input, voice input, or a combination thereof. Being able to accept voice input can enhance the user experience because a user can describe desired actions without needing to type or input text. For example, the user can narrate what is desired and the voice input is converted to text. The user interface can enable a continuous listen/process and build experience where the user describes a flow and verifies that the flow is getting updated corresponding to the instruction provided and can continue to add or update the flow without having to use the keyboard/mouse (e.g., touchless). Some feedback (e.g., visual, text or audio response to the input message) can be provided back to the user for any corrections required.

A workflow can be graphically represented as a flow with joined objects where objects are triggers, actions, etc. The workflow can also be represented (in the backend) by a list of instructions or structured data such as XML. Thus, a user may interact with the workflow by dragging and dropping objects to the workflow UI, which is then stored in the backend as structured data. For example, UI interactions, error messages, logs, and other data are stored as structured messages. In various embodiments, the co-pilot operates on structured data.

Conversation data can be any type of (natural language) input in any language (e.g., English, French, etc.). Typically, conversation data is provided by a user to express a desired function or action. Example conversation data/commands for a workflow include:

"This flow is triggered when a certain table record is created."

"Trigger this flow whenever a new catalog item is submitted."

"I want a flow that will trigger every day at 5:00 AM."

"I want to create a flow which can deal with major incidents. Once there is a major incident, send a notification to the group on Product A, so that people are notified and then create a Product B integration, so that people are called onto a bridge to deal with this major incident."

"Whenever there is a P1 incident, look on a daily basis and send an email to the assigned to, as well as create a Product B group and a Product A channel and pull all the people in together."

Series equivalent:

"Check on a daily basis for a P1 incident"

"Send an email to the assigned to"

"Create a Product B group and a Product A channel"

"Pull all the people in together."

"Tell me why this flow was erroring out. There was something wrong with it, it errored out the last few times. Tell me why is that? Take me to the 'task record' against which the workflow errored out"

As shown in the examples above, conversation data can be short phrases or long narratives. As further described herein, once an issue has been identified and resolved, a user can resume/retry to fix any failing workflows via the co-pilot console. While some of the examples provided herein describe a co-pilot console used in conjunction with a Work Flow Designer as the first builder, this is not intended to be limiting as the disclosed techniques can be extended to other builder (build UI, explore Platform UI, building dashboards, etc.) experiences as well.

The process determines, via a machine learning model, computer instructions corresponding to the user requested function (102).

The process facilitates use of the development platform (e.g., workflow designer) because it is the process that generates computer instructions and the user need not have extensive knowledge or skills with respective to the development platform. For example, the user does not need to drag and drop objects to the workflow designer to create the flow. Instead, the system updates the workflow accordingly.

A single user requested function (command or a description) can be mapped to one or more actions in the workflow. For example, for the request "Whenever there is a P1 incident, look on a daily basis and send an email to the assigned to, as well as create a Product B group and a Product A channel and pull all the people in together," corresponds to the following actions:

"Check on a daily basis for a P1 incident"

"Send an email to the assigned to".

"Create a Product B group and a Product A channel"

"Pull all the people in together."

In various embodiments, a machine learning model is trained to receive a natural language input and output one or more statements corresponding to the input. By way of non-limiting example, the machine learning model is a (large) language model. The model can be proprietary or publicly available such as GPT-4. The model can be trained with existing workflows or other data. In various embodiments, the output is a statement that can be post-processed to be intelligible for the environment/computer as further described with respect to FIG. 3. The ability of the machine learning model to output statements (not ready for computer execution) or computer instructions depends on the type/quality of training data. In various embodiments, the output can be computer instructions appropriate for the workflow without needing further processing.

In various embodiments, training data includes one or more of the following:

Structured or semi-structured Extensible Markup Language (XML) corresponding to the workflow An intermediate format for the workflow Natural language input A workflow, which may be represented graphically on a user interface as further described herein, may be stored in a structured format in the backend. For example, a workflow may be represented in Extensible Markup Language (XML) or other metadata representation. Because the representation is structured, steps/actions (and corresponding inputs/descriptions) of the workflow may be identified. The computer instructions may be generated in any format/language that can be processed by a computer such as JavaScript Object Notation (JSON).

Using the example of conversation data that is "create a P1 incident and send an email," the trained machine learning model can separate the conversation data into one or more statements such as:

Within Flow Designer,

Click or add the trigger button, and add a trigger based on the input criteria/condition Add "send email" action The process then updates the statements with parameters specific to the workflow to form one or more computer instructions (e.g., in JSON format):

Add 'Send Email' action.

Subject='Priority 1 Incident Created,'

Body='A Priority 1 Incident has been created and assigned to you. Please take immediate action.'

In various embodiments, the subject/body is initially populated using information provided by the machine learning model. The information can be updated by the user, e.g., using the Flow Builder UI or via the tiles which will keep the tile and Flow Builder UI updated and vice versa.

In various embodiments, the machine learning model can directly generate the JSON instructions, if adequately trained.

Previously generated computer instructions can be taken into consideration when generating a computer instruction. In various embodiments, an output of a previous action/instruction can be used as an input of one or more subsequent (e.g., current or newly created) actions/instructions. The previously generated instructions can set a context for the subsequent actions.

In various embodiments, a natural language understanding model is aware of a generic set of actions/tables/metadata only and not the specific customer tables, etc. In this case, the "text processing" on the co-pilot can provide additional context to the natural language understanding model to "fine tune" or "prompt engineer assist" so that the output instructions have improved accuracy and involves less probabilistic post-processing to map the user's description the actual available actions/table/scripts/sub-flows and other metadata.

In various embodiments, earlier instructions/action can be used to train and improve the performance of the natural language understanding model and improve. A user's input and the generated output would become more accurate as ore scenarios are tested, built, and edited.

The process updates the workflow to include the computer instructions corresponding to the user requested function (104). For example, in the tile view, while the user is describing the desired actions, tiles are added, and the workflow can be created dynamically (in real-time or near real-time). For example, XML corresponding to the workflow is updated so that when the updated workflow is executed, the user requested function is performed as well or as part of the workflow. In various embodiments, the process includes executing the computer instructions to perform the user requested function.

In various embodiments, the conversation data is characterized by a conversation between a user and a computer system. An example of a conversation is further described herein in which a chatbot (FIG. 5A) or a tile (FIG. 5B) is presented.

Figure 2:
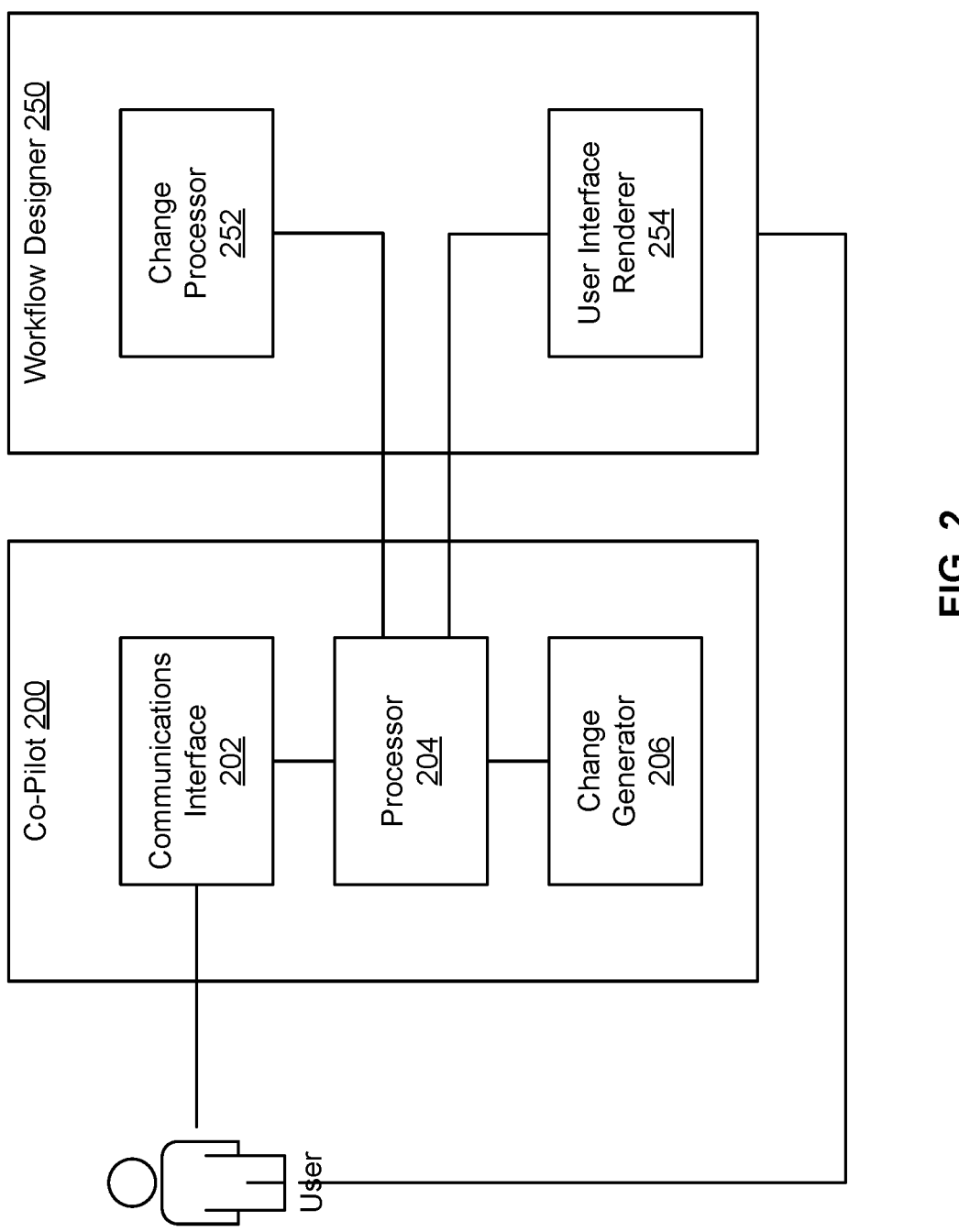
FIG. 2 is a block diagram illustrating an embodiment of a system for providing a bi-directional co-pilot for development platforms.

FIG. 2 is a block diagram illustrating an embodiment of a system for providing a bi-directional co-pilot for development platforms. The system includes a co-pilot 200 and a workflow designer 250. The user can interact with the co-pilot and/or the workflow designer.

In various embodiments, the workflow designer 250 includes a change processor 252 and a user interface renderer 254. The change processor 252 (sometimes called a change listener) is configured to represent a workflow as structured data (e.g., XML). The change processor 252 is configured to represent changes made to the workflow (e.g., via the co-pilot or directly made on the workflow). In various embodiments, the change processor 252 represents the changes including by detecting changes in the workflow designer 250 and sending the changes back to the processor 204. The processor generates a natural language description to be output, e.g., output in a tile view of the co-pilot as further described herein. In various embodiments, the change processor 252 represents the changes including by receiving instructions from the processor 204 and relaying them to the workflow designer 250 for the workflow to be updated when the user adds new information, e.g., in a chat/tile view of the co-pilot. The user interface renderer 254 is configured to represent a workflow graphically.

In other words, the change processor enables the co-pilot to be bidirectional. The change processor detects incoming changes from the co-pilot 200 and processes the instructions to be sent to the user interface renderer to 254 to add new/update actions based on a user's description. The change processor detect changes to the workflow designer 250 (e.g., made by the user) and sends them to the co-pilot processor 204 for the summary generation. Messages associated with the summary generation are then output, e.g., via a co-pilot console where the Tile is updated with the up-to-date description of the action changed.

In various embodiments, the co-pilot includes a communications interface 202, a processor 204, and a change generator 206. The communications interface 202 is configured to receive conversation data and output a response to the conversation data (e.g., where the response is determined by a natural language understanding model). In various embodiments, additional information can be added to the user entered prompt/description to fine tune and adapt the machine learning model response that makes it easier for post-processing.

The processor 204 is configured to perform the process of FIG. 1 and output instructions to the user interface renderer 254 to update a graph representation of a workflow to reflect the user requested function.

In various embodiments, the co-pilot 200 is provided as a service separate from a platform (e.g., a platform hosting the workflow designer). In one aspect, this allows the co-pilot to be deployed in various environments/applications within the platform. In another aspect, the co-pilot can be updated separately from platform updates to incorporate improvements to processing (e.g., text processing) and new options/ways for users to interact with the co-pilot. The co-pilot service implemented by co-pilot 200 can be presented with an environment (here, workflow designer 250) as a co-pilot console or chat window. An example is further described with respect to FIG. 7.

In various embodiments, a co-pilot console provides the state and context of the environment, and the co-pilot service 200 is a stateless service. Based on the user requested function, the co-pilot service determines, based on probability, computer instruction options. In various embodiments, post processing logic of the change generator 206 can have probabilistic/algorithmic determination of the correct inputs for various actions. The design for the post-processing could be packaged for individual user interfaces/features. For cases where customers have specific metadata where natural language understanding models may not be able to provide accurate step information, this design could also have a persistent layer with database tables that could have context/aliases as a part of the custom application to rank higher on probability to be picked up algorithmically. In various embodiments, the algorithm could use decision trees for calculating the probability, which reduces the effort for the user to go back and edit generated actions.

The change generator can cater to any particular environment or UI, e.g., performing 302 and/or 304 of FIG. 3 as further described herein. In various embodiments, the change generator 206 can be implemented as a package, so a respective package is distributed for a specific application. For example, the co-pilot service can be adapted to the workflow designer 250 application/environment by using a specific package. In various embodiments, the package includes a natural language processing script (e.g., natural language generation APIs) to translate code to natural language. The Natural language processing can be performed with or without the natural language understanding model depending on a desired speeds vs. accuracy tradeoff. For example, using a script alone can be faster than using the natural language understanding model, but results might be less accurate. For example, whenever a user manually adds an action on the Flow Designer side, then the action is processed using the natural language script to generate a natural language. This may be shown in a tiles view as further described herein, for example.

FIG. 3 is a flow diagram illustrating an embodiment of a process for customizing computer instructions for a specific environment. This process may be implemented on a co-pilot 200 shown in FIG. 2 (e.g., 204 in cooperation with 206), a workflow designer 250, or the processor 1102 shown in FIG. 11. This process may be performed as part of another process such as 102 of FIG. 1.

In the example shown, the process begins by obtaining statements from the machine learning model (300). The machine learning model takes natural language as input and generates one or more statements not yet ready for computer execution. For example, the input may be missing parameters or have incorrect syntax.

The process determines one or more parameters specific to the workflow (302). In various embodiments, the statements obtained from the machine learning model can post-processed. For example, a workflow designer 250 processes the statements to make them suitable for representation in its environment. Statements generated by the machine learning model might not necessarily have the correct parameters for a specific instance. For example, a computer instruction generated by the machine learning model leaves a table name blank or includes a placeholder table name, "user_preference_table." The table name can be determined/verified by using an application programming interface (API) to determine the specific internal table name, for example "user123_settings." The API may interface with a natural language understanding model, which can be centralized or local to a specific instance. The specific internal table name may be selected from several possible candidates based on probability. For example, if the computer instruction pertains to an incident, then candidate tables may be those relevant to incidents and not other tables.

The process determines an environment in which the statements are to be used (304). For example, the environment is determined to be a flow designer. Using this information, the process determines how to incorporate the user's requested function into the current environment. For example, the process determines that the current context is a workflow designer, and interprets the user commands accordingly to generate appropriate instructions intelligible to a workflow designer.

Another example environment is a UI designer. Example user request functions for a UI include:

"Can my UI show a list of all the priority one incidents that have not been closed in a certain day?"

"Now add a chart which shows the priority incidents and which team they're coming from. Show a donut graph."

"Show me all the columns that have a name in them or show me the email address of a certain user."

Another example environment is a form designer. An example user requested function is "I do not like the current form. Can you update the form to show me the list of create sections, so personal information is on the top?"

In various embodiments, the process detects that certain fields that expect information to be input are missing information. For example, a tile/card view of the co-pilot is displayed alongside the workflow designer UI. The cards describe in natural language the corresponding information in the workflow designer UI as further described with respect to FIG. 7. The cards can be dynamically updated. For example, if a user selects a certain card, the appropriate actions that were created, and the corresponding information in the workflow designer UI would also be highlighted.

The process generates the computer instructions including by updating the statements to include the one or more parameters and formatting the statements to be intelligible for the environment (306). By updating parameters and updating the statements for the environment, the statements generated at 102 can now be intelligible and executable.

FIG. 4 is a flow diagram illustrating an embodiment of a process for providing bi-directionality in a co-pilot for development platforms. This process may be implemented on a processor such as the co-pilot 200 shown in FIG. 2 or the processor 1102 shown in FIG. 11.

In various embodiments, the co-pilot is bidirectional. For example, a first direction is a user describing desired functions/actions, and computer instructions are generated to implement the desired functions/actions in a workflow designer. The second direction is a summarization mechanism that summarizes the workflow in natural language. If a user adds something to the flow, the corresponding card is updated dynamically. Thus, there is synchronization between the workflow designer and the co-pilot.

In the example shown, the process begins by receiving user input with respect to an element of the workflow (400). A user can make edits using the co-pilot. Sometimes the co-pilot determines computer instructions that are inaccurate or do not match the initial user requested function. Because the co-pilot is bidirectional, the accuracy can be improved. For example, the user types "Trigger a flow when a service bot request is created."

The process determines conversation data corresponding to the received user input (402). Suppose there are two tables that are possible candidates, and the co-pilot selects the more probable one, but if the co-pilot selects the incorrect table, the user can select the correct table, e.g., by changing the table name in the response/tile presented by the co-pilot.

The user can change the table name in the workflow UI, and this automatically updates the corresponding card in card view.

The process outputs the conversation data corresponding to the received user input (404).

The co-pilot can display acknowledgements and/or recommendations in response to user input. For example, if the user makes an incomplete request such as "create a trigger," the co-pilot can ask for clarifications or determine what is missing and request the missing information such as "please provide a table for the trigger." As another example, possible options are presented to the user based on the options being above a confidence threshold. For example, Table 1, Table 2, and Table 3 are possible and these are presented to the user via the co-pilot for selection.

With respect to summarization, the bi-directional functionality allows a user to quickly understand a workflow. For example, a user who did not design a complex flow can nevertheless understand the flow by reviewing a summary (in natural language) of the workflow generated using the disclosed techniques.

The bi-directionality characteristics of the co-pilot will now be illustrated using the example of building a workflow from scratch. In various embodiments, the process facilitates construction of a workflow from scratch. For example, a user authors a flow by first logging in as a flow designer. The user interacts with the co-pilot (e.g., chat view). The user describes the entire flow to the co-pilot, and the flow is generated using the disclosed techniques such as the process of FIG. 1.

The user can modify the generated workflow as follows. In various embodiments, there is a configurable option where the user interface remains in the chat view or automatically toggles to a tile view. Suppose the user prefers to edit the workflow via tile view. In tile view, one or more tiles (each corresponding to a computer instruction/action created by the process of FIG. 1) are shown.

From the tile view, the user can modify a specific tile to update the corresponding action on the workflow. For example, if a tile says that an incident is created, the user can later modify the tile to say something different such as task created, incident updated, or change created. The user can change the conditions and inputs corresponding to an action. After that there is a send email action. Suppose the user wants to change the send email action to a send SMS action. This can be done from the respective tile by modifying the text in the tile. Alternatively, this can be done directly within the workflow designer by deleting the send email action and adding a send SMS action. The first tile will be updated to say, "Whenever an incident is created," and the second tile will be updated to say "Send an SMS to assigned to."

In addition to building code from scratch, the co-pilot may also facilitate code edits. Conventional techniques typically are unable to effectively help users when users do not have domain knowledge to debug code. For example, a user may wish to debug a certain piece of code or understand why the code is not working. Conventionally, the user may need to look in many different screens or data sources to understand why the code is not working.

Debug data aggregation and processing can be performed by the co-pilot. If a workflow is not functioning as intended, there could be various reasons such as a server being down, credentials are incorrect, or inputs do not match what is expected. The co-pilot can retrieve and display a log with more detail/context to help the user determine the root cause more quickly. The user need not leave the co-pilot console, because the log, a link to the log, an error message exception call stack (or the like) may be displayed within the co-pilot. In various embodiments, the user is able to interact with the provided logs to fetch more details and continue to use the co-pilot to query for additional information which could lead to the main UI navigating based on the "received" response from the co-pilot service.

An example exchange is as follows:

A user asks

"This flow did not run last night when it was supposed to run,"

"Show me the number of emails that were sent out," or

"This flow timed out last night. Can you show me why or the exception messages?"

"Show me the configuration for a Vendor A setup".

"Were there any REST failures around that time?"

"How was the server load at the time of the failures?"

The co-pilot responds with

A link to or the log itself

"Okay. The 500th iteration failed because there was a problem with the user record. The user actually is no longer a part of the system."

Take the user to that particular UI where the failure occurred

The co-pilot can determine and provide additional information or analysis based on what has happened in the environment. The additional information can be based on output of machine learning models (e.g., a large language model), aggregation of data across various sources (e.g., tables or UI screens), etc.

A co-pilot can be provided within the context of an operations page/environment, which is where execution of a flow is displayed. After the flow is tested, the co-pilot navigates the user to the flow execution. As described herein, the co-pilot console is floating on that particular page and will understand what the page does. The co-pilot has the underlying context of the tables in which the data is stored and the executions, etc. When the user asks a question, the co-pilot can aggregate and pull the data back from the flow. For example, the user can quickly test a workflow with a given input or ask for performance audit of a flow.

The following figures show examples of a graphical user interface for providing a bi-directional co-pilot. The user requested function in the following example is to create a workflow informing the "assigned to" (user) when a priority one incident is created by sending an SMS to the manager about the incident and emailing to the "assigned to" (user).

This user requested function is merely exemplary and not intended to be limiting as other user requested functions are possible.

Figure 5B:
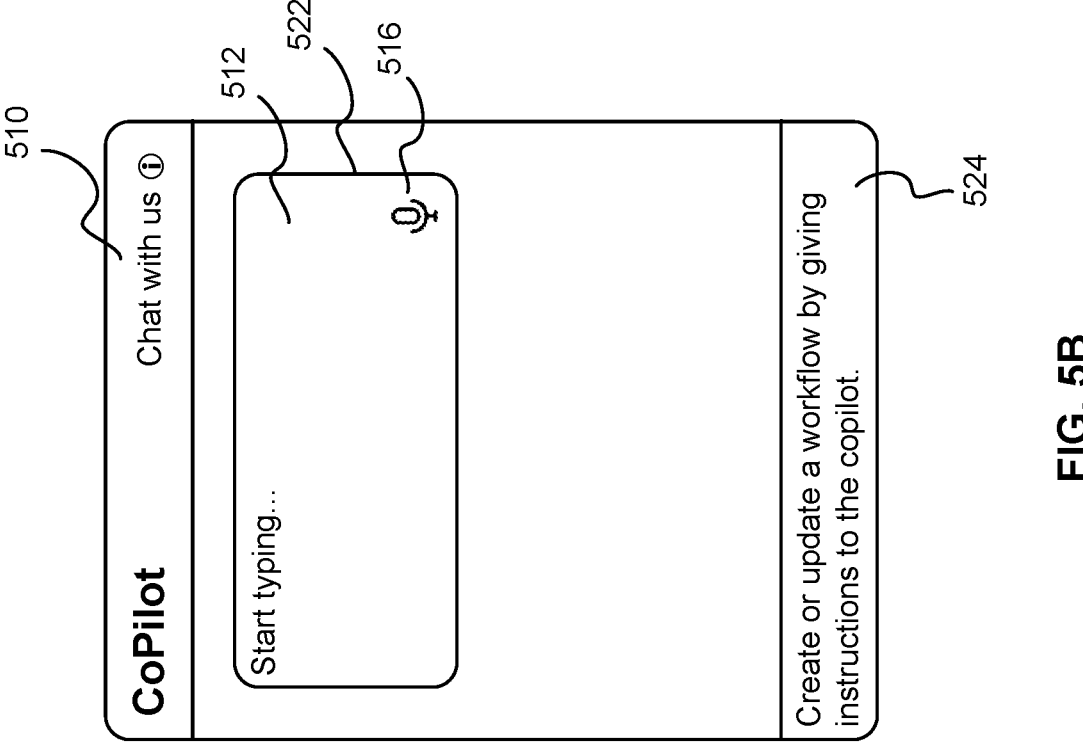
FIG. 5B is a diagram illustrating an example of a graphical user interface including a tiles view for a bi-directional co-pilot for development platforms.
Figure 5A:
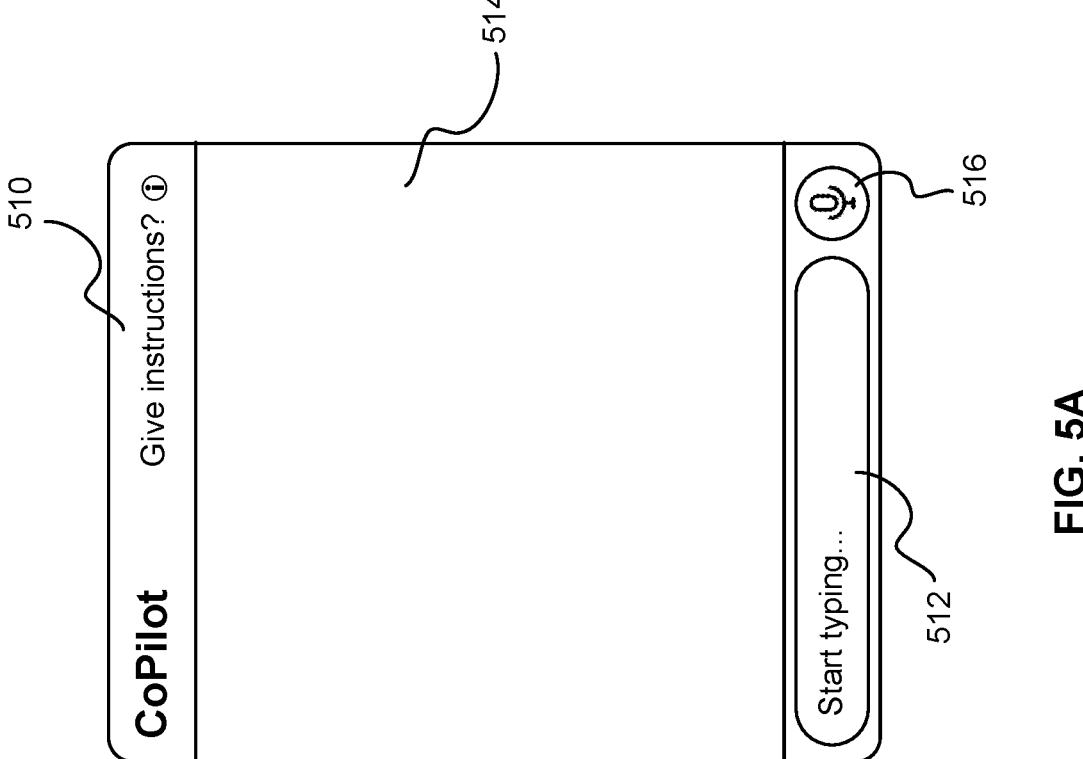
FIG. 5A is a diagram illustrating an example of a graphical user interface including a chat view for a bi-directional co-pilot for development platforms.

FIG. 5A is a diagram illustrating an example of a graphical user interface including a chat view for a bi-directional co-pilot for development platforms. In various embodiments, the graphical user interface presents the information in one or more views and can switch between the views via a toggle link/button (e.g., 510). In the following examples, a first view is a chat view ("A") and a second view is a tile view ("B"), but this is merely exemplary and not intended to be limiting as other views are possible. In a chat view, a user may interact with the co-pilot via chat, and the user experience may be similar to using a chatbot. In a tiles (or instructions) view, user input is displayed as one or more tiles alongside a workflow UI. Both views support user interaction and an iterative code development experience.

In this example, the user interface displays a chat view, which allows a user to input a scenario to build a workflow. The user may provide input as voice and/or text. For example, the user may select button 516 to activate a microphone for collecting voice input. The user may input text in box 512. In various embodiments, the collected input may be displayed in area 514 so that the user can confirm that the input is correct and matches what the user has provided.

If the input is a voice input, it is converted to text. The voice input can be converted to text using a natural language model as further described herein. Computer instructions can be generated from the text using a machine learning model such as a large language model. The computer instructions may be specific to the current user interface.

A user can switch from the current view (chat view) to another view (tiles view) by clicking 510.

FIG. 5B is a diagram illustrating an example of a graphical user interface including a tiles view for a bi-directional co-pilot for development platforms. In this example, the user interface displays a tiles view, which allows a user to input a scenario to build a workflow. Each of the components are like their counterparts in FIG. 3A unless otherwise described.

Directions area 524 provides directions to the user regarding how to use the current view. Here, the user is directed to create or update a workflow by giving instructions to the co-pilot. For example, instructions may be input to tile 522 in area 512. Tile 522 can receive user input, and the user input may be edited. As further described herein, one or more tiles may be displayed. One or more tiles can be re-ordered and removed (e.g., by a user), which triggers corresponding changes on the workflow designer user interface. New tiles can be added in between other tiles which will also trigger the corresponding update to the Workflow UI.

Regardless of the type of view, the co-pilot can receive and process any type of input. The input may be a series of short inputs or can be a single long (verbose) input. If the input is long, it may be split up into several instructions.

FIG. 6A is a diagram illustrating an example of a graphical user interface including a bi-directional co-pilot for development platforms in a first state. In this example, the user provides an input: "Create a workflow informing the assignedto whenever a priority one incident is created and also send an SMS to the manager about the incident and email to the assignedto."

The instructions generated based on the user input include:

"Add trigger of type 'Created' where fields are: Table='incident', Condition='priority=1'".

"Add 'Send Email' action. Subject='Priority 1 Incident Created', Body='A Priority 1 Incident has been created and assigned to you. Please take immediate action.'."

"Add 'Send SMS' action. Text Message='Priority 1 Incident Created and assigned to Trigger-Record Created-.IncidentRecord.Caller.email' Please take immediate action.'."

These instructions can be post-processed by a change generator (e.g., 206 of FIG. 2), then sent to the change processor (e.g., 252), then relayed to a user interface renderer (e.g., 254). In this example, the user inputs the instructions via text in box 612. To trigger processing of the text input, the user can click button 632. It may be beneficial to receive user confirmation that the input is complete in case the user needs to edit the input prior to processing. In various embodiments (not shown), the text input is automatically processed without needing further user input.

FIG. 6B is a diagram illustrating an example of a graphical user interface including a bi-directional co-pilot for development platforms in a second state. In this example, the co-pilot is processing the user input. Various visual indicators of the processing state may be shown. For example, a cycling symbol may be displayed, at least a portion of the user interface may be grayed out, etc.

FIG. 6C is a diagram illustrating an example of a graphical user interface including a bi-directional co-pilot for development platforms in a third state. Computer instructions corresponding to the user input, which may be obtained using the process of FIG. 1, may be displayed in the user interface. In this example, which is a chat view, the computer instructions 642, 646, and 648 are output. The output may be visually distinguished from the user input, for example, by having a different color background or alignment (e.g., to the left of the chat window) to indicate response from the server.

Figure 7:
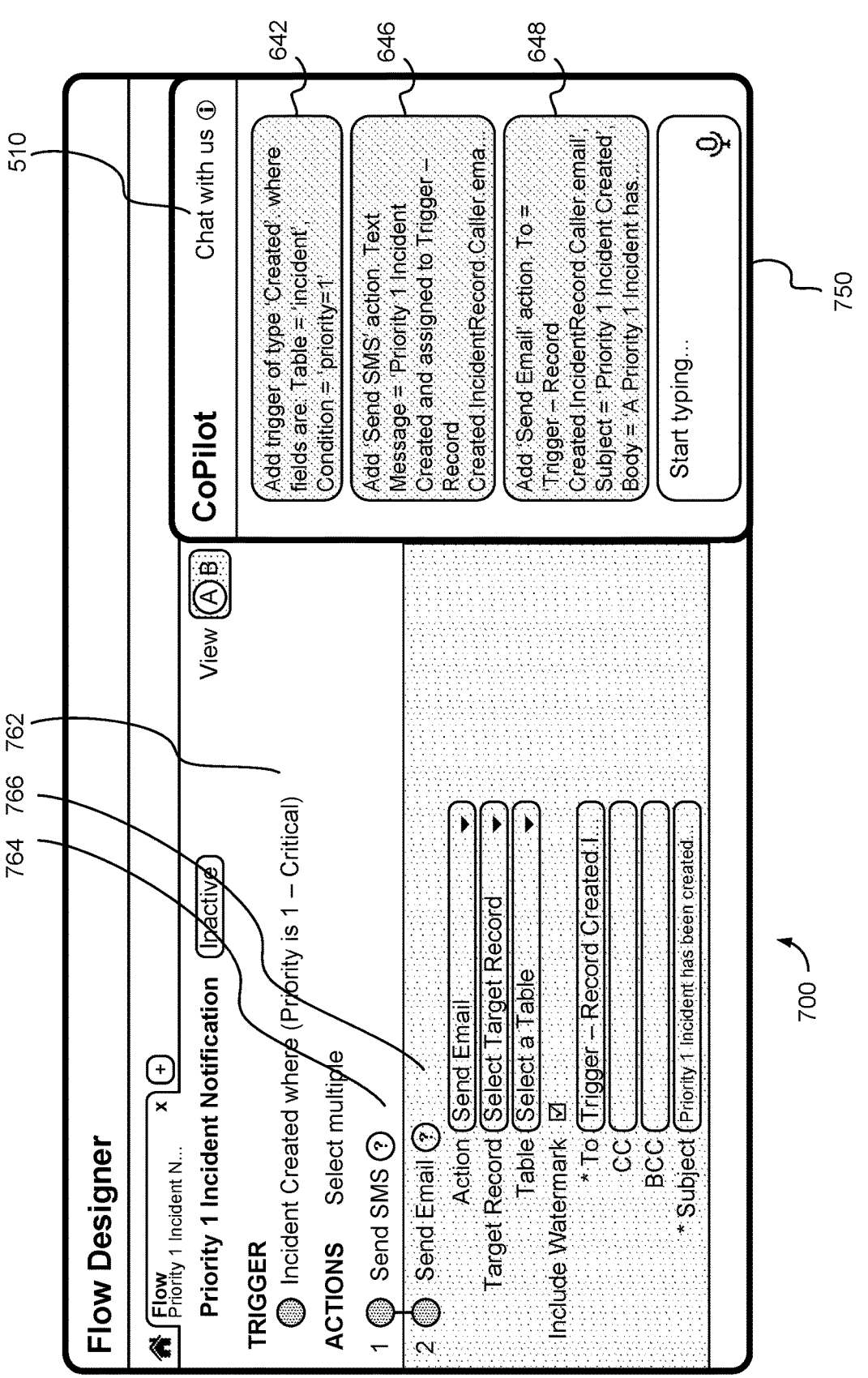
FIG. 7 is a diagram illustrating an example of a graphical user interface including a workflow designer and a bi-directional co-pilot for development platforms.

FIG. 7 is a diagram illustrating an example of a graphical user interface including a workflow designer and a bi-directional co-pilot for development platforms. A user can review and edit the input or the corresponding computer instruction. For example, the user can edit previous input statements via chat or tiles. As another example, after the input has been converted to a computer instruction (action), the user can update the specific action. An example correction is "Instead of sending to the VP, send to the SVP."

Each of the components are like their counterparts in FIGS. 6A, 6B, and 6C unless otherwise described.

In this example, co-pilot console 750 is displayed within (alongside, overlay) flow designer 700.

Once the input is processed, computer instructions are retrieved from the machine learning model and post processed (e.g., by change generator 206 of FIG. 2). In various embodiments, the post-processing performed includes mapping an output of a natural language understanding model to match the current context of the user interface which also includes a probabilistic match for various inputs for the new step added. The packages available in the co-pilot service can be updated offband to a major release and may have a persistence layer backing up the decision tree with more inputs (e.g., around custom metadata such as scripts, tables, sub-flows, actions, etc.). The workflow is generated in the flow designer 700. In various embodiments, the view automatically switches to tile view to display tiles for each respective step/action in the workflow. The user can switch back to the chat view at any time using toggle switch 510.

Each tile corresponds to a particular step/action in the workflow and can be edited directly to update the corresponding step/action in the workflow. For example, tile 642 shown in FIG. 7 corresponds to workflow step 762, which is a trigger step. Tile 646 corresponds to workflow action 764, and tile 648 corresponds to workflow action 766.

For simplicity, action 762 is minimized (not showing the details and input parameters) in this example, while action 766 is maximized (showing the details and input parameters). By default one or more actions may be minimized and/or maximized. In various embodiments, the example shown here is the default behavior of the workflow designer to maximize the space utilization on the page In this example, the send email action 766 is automatically populated with the information provided in tile 648. For example, the "To" field is "Trigger-Record Created.IncidentRecord.Caller.email." The email address can be found by looking the information up in a table. For example, a table may store incident types and who they are assigned to. Thus, the user does not need to know the actual identity of the assigned to. Indicating that the assigned to should be emailed will cause the co-pilot to look up the appropriate assigned to and create the email action shown here. The input at the workflow designer user interface is label/description (here, Trigger-Record Created.IncidentRecord-.Caller.email) instead of a hard-coded value (e.g., doe123@example.com)

In various embodiments, the steps/actions in workflow designer 700 are editable. For example, the user may determine that a CC (e.g., in 768) should be added and input this information in the workflow designer 700. This triggers a bi-directional change to update the description in the tile (e.g., 648) which corresponds to the Send email action.

Figure 8:
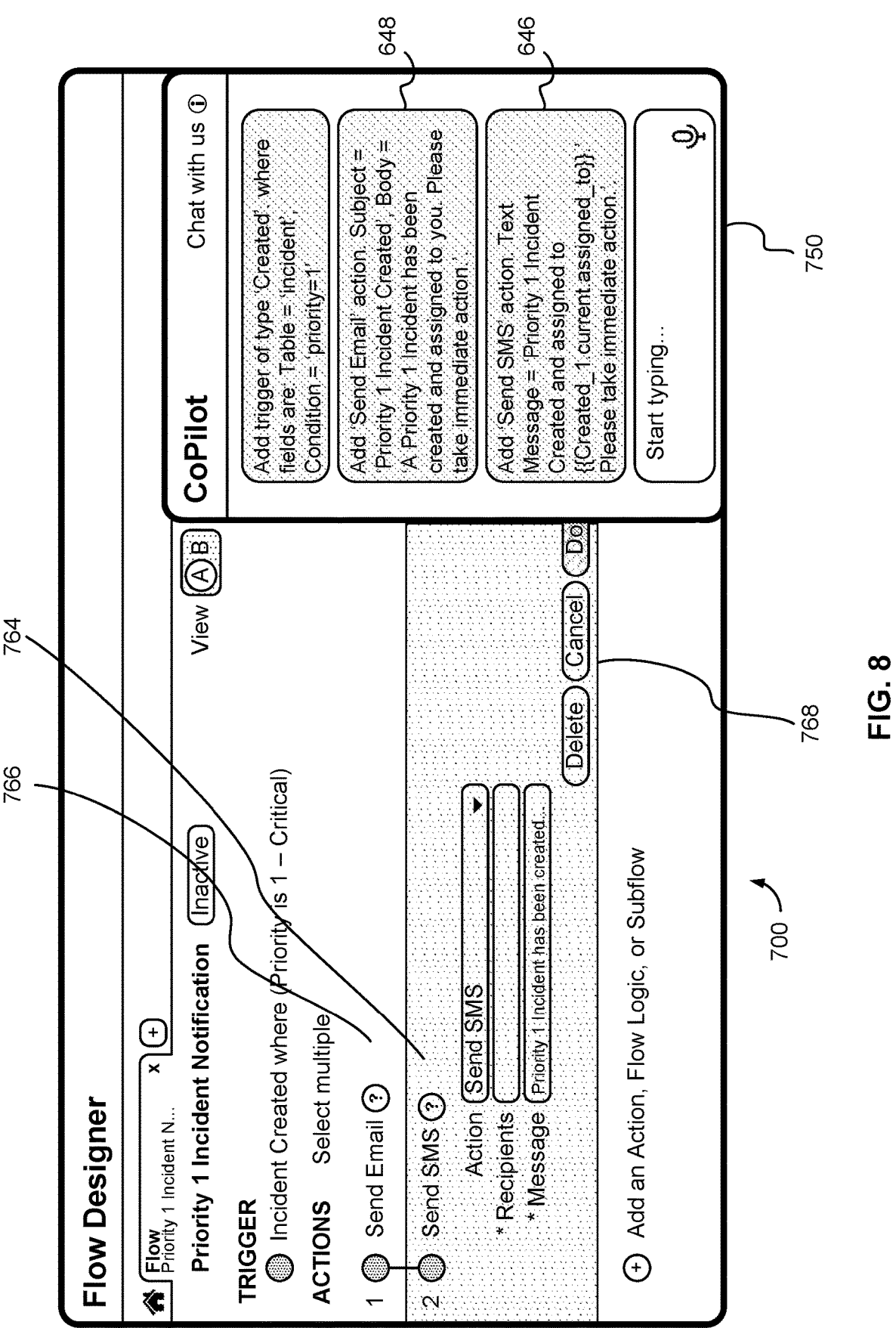
FIG. 8 is a diagram illustrating an example of a graphical user interface including an update in a workflow designer in response to switching tiles to a bi-directional co-pilot for development platforms.

FIG. 8 is a diagram illustrating an example of a graphical user interface including an update in a workflow designer in response to switching tiles to a bi-directional co-pilot for development platforms. Each of the components are like their counterparts in FIG. 7 unless otherwise described. A user can change the tiles, and the updates are reflected in the flow designer. The updates may be made dynamically. Examples of changes include changing the order of tiles (FIG. 8) and editing the content of the tiles (e.g., the user input) (FIG. 9).

In this example, compared with FIG. 7, the user switches the order of tile 646 and tile 648 in the co-pilot 750, so that a send email action precedes a send SMS action. The workflow designer 700 is updated accordingly. That is, the send SMS action 764 now follows the send email action 762.

Similarly, the user can change the flow designer, and the updates are reflected in the tiles as shown in the next figure.

Figure 9:
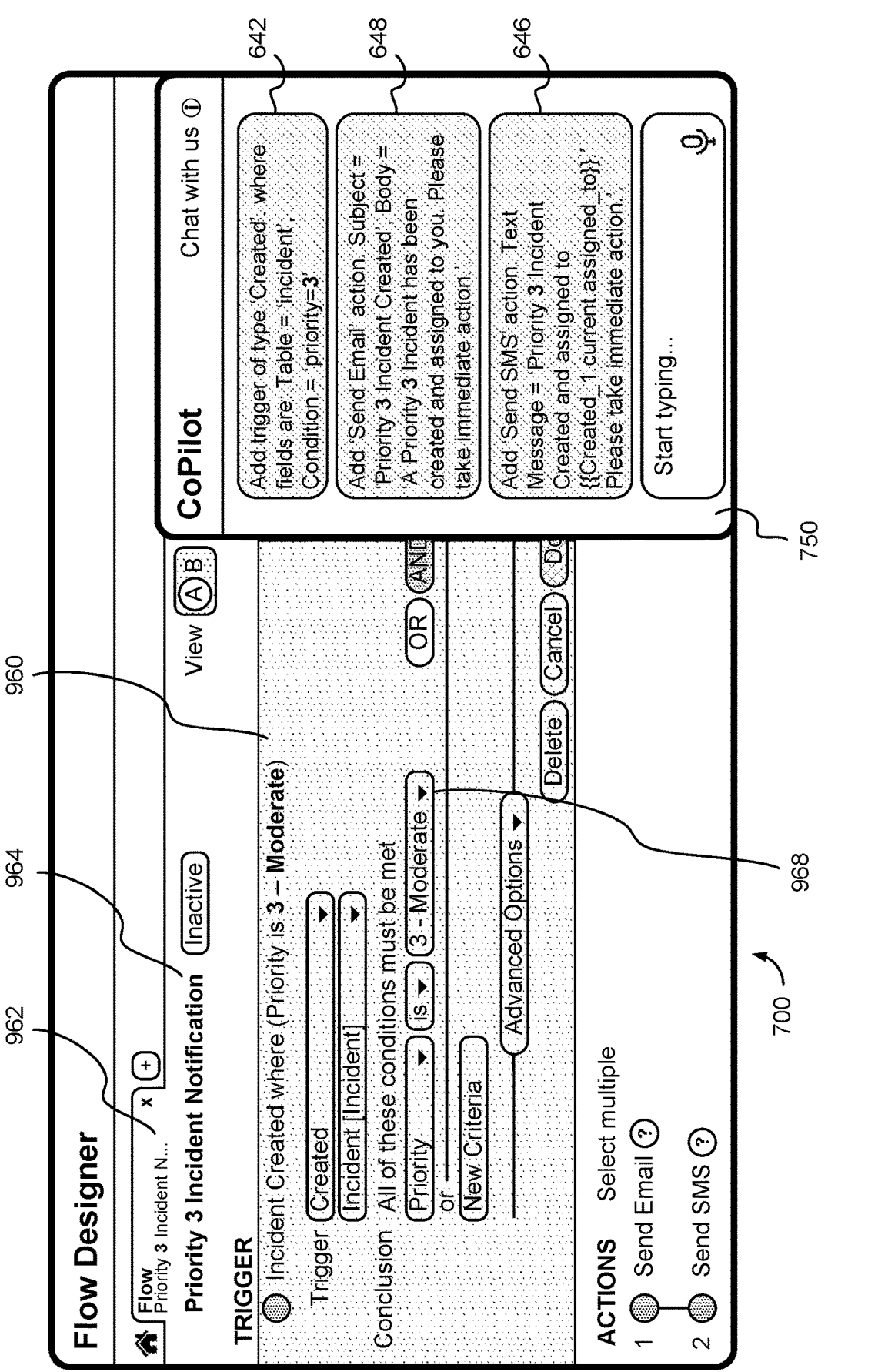
FIG. 9 is a diagram illustrating an example of a graphical user interface including an update in a workflow designer in response to input to a bi-directional co-pilot for development platforms.

FIG. 9 is a diagram illustrating an example of a graphical user interface including an update in a workflow designer in response to input to a bi-directional co-pilot for development platforms. Each of the components are like their counterparts in FIG. 7 unless otherwise described. In this example, compared with FIG. 7, the user edits 960 to the workflow designer portion 700 by changing the priority to "3." In this example, the priority level is changed in area 962 by selecting from the dropdown menu. The tiles 642, 648, and 646 are updated accordingly to update the priority to level 3.

In various embodiments, the workflow designer 700 is updated accordingly, at locations 968 and 964 that make reference to the priority level.

Figure 10:
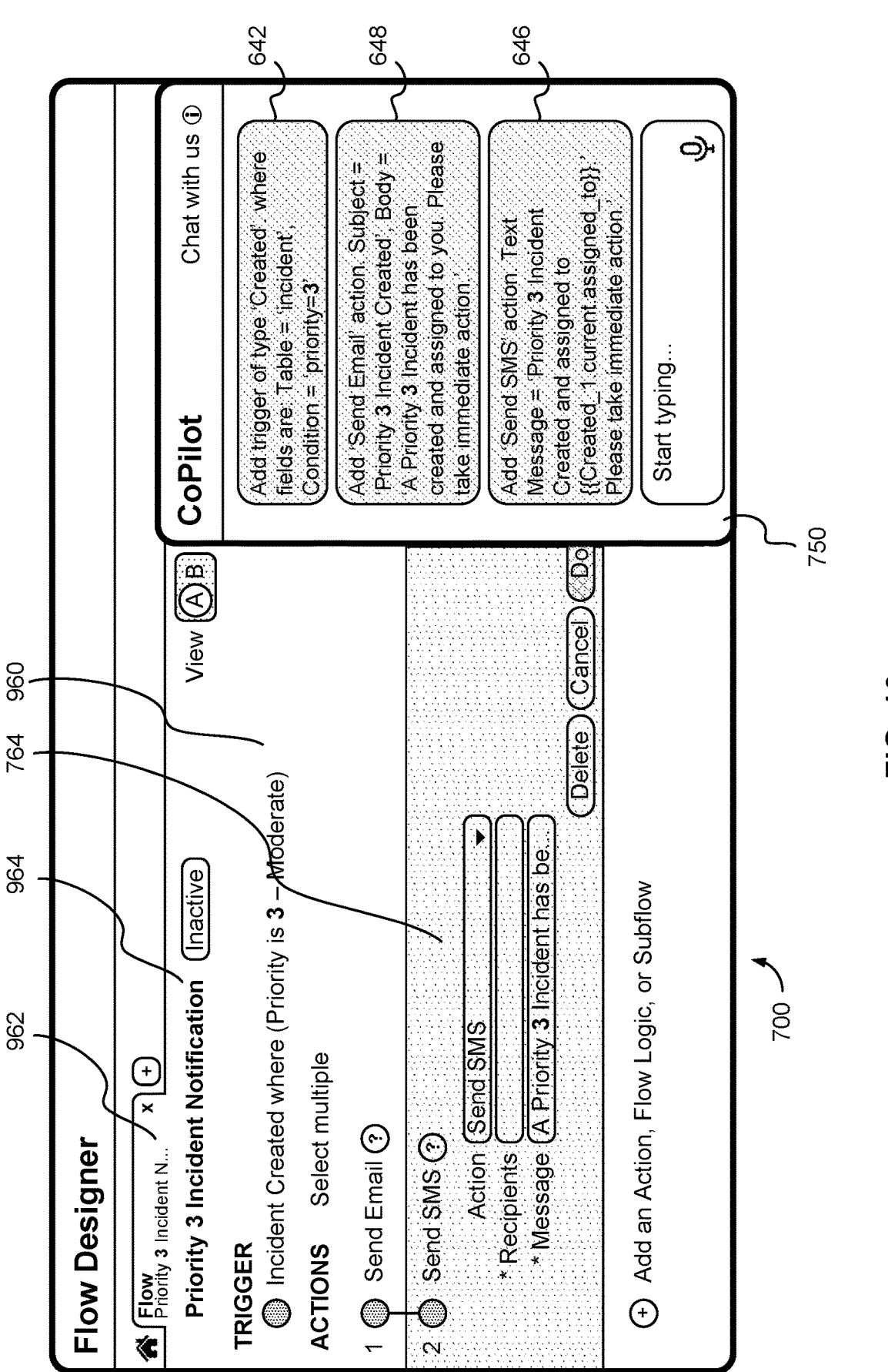
FIG. 10 is a diagram illustrating an example of a graphical user interface including an update in a bi-directional co-pilot for development platforms in response to changes in a workflow designer.

FIG. 10 is a diagram illustrating an example of a graphical user interface including an update in a bi-directional co-pilot for development platforms in response to changes in a workflow designer. Each of the components are like their counterparts in FIG. 7 unless otherwise described. In this example, compared with FIG. 7, the user edits 760 to the co-pilot portion 750 by changing the priority to "3" in tile 642. The workflow designer 700 is updated accordingly, at locations 962, 964, and 960 that make reference to the priority level. Corresponding input parameters in each of the actions/steps are also updated. For simplicity, only the input parameters for the send SMS action 964 are shown. In section 964, the message is updated to priority level "3."

In various embodiments, the other tiles 648 and 646 are updated accordingly to update the priority to level 3.

For clarity, in FIGS. 9 and 10 the changes are shown in "bold," but in various embodiments the changes may be visually distinguished in other manners or not visually distinguished at all.

Figure 11:
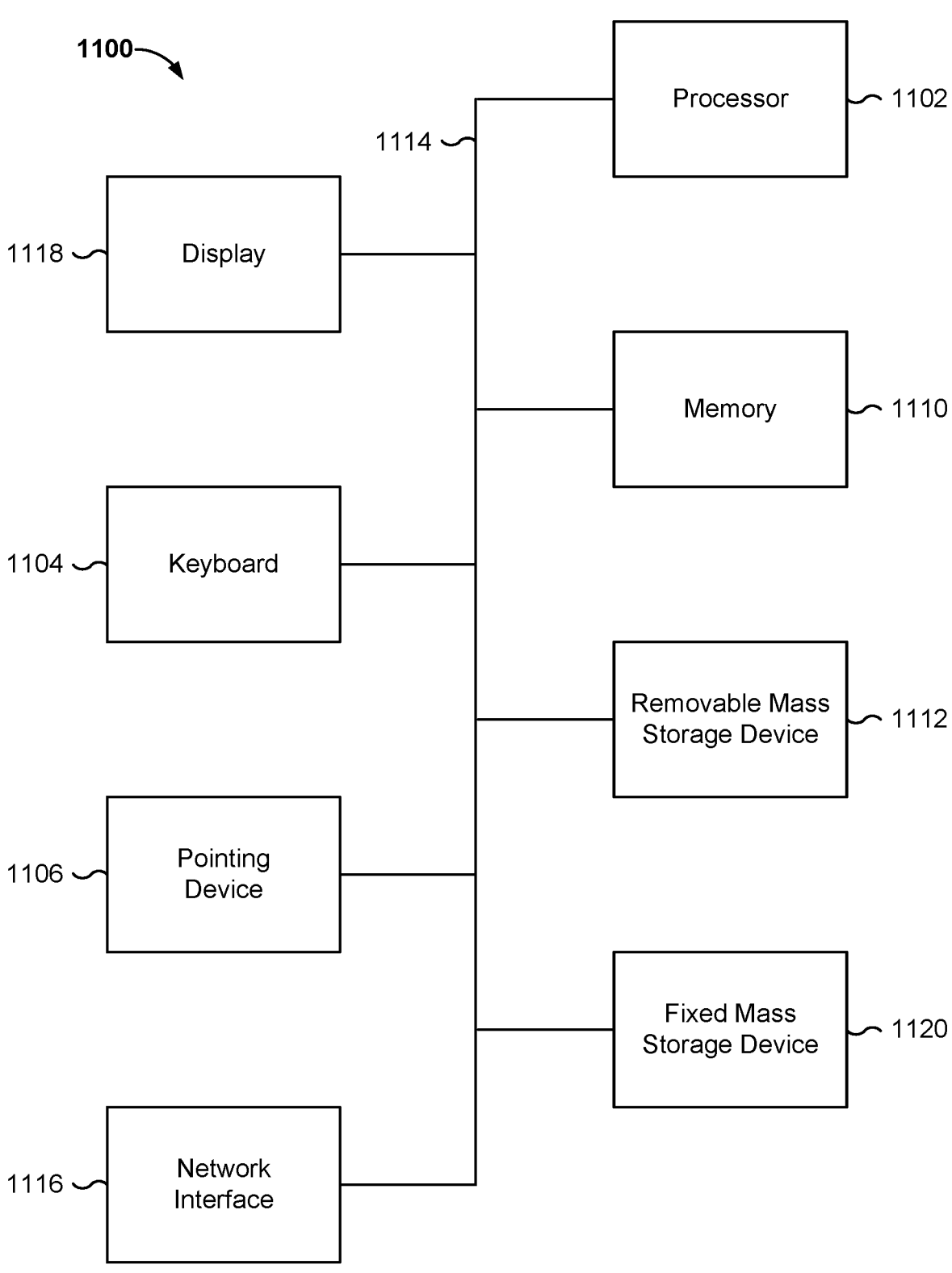
FIG. 11 is a functional diagram illustrating a programmed computer system for providing a bi-directional co-pilot for development platforms in accordance with some embodiments.

FIG. 11 is a functional diagram illustrating a programmed computer system for providing a bi-directional co-pilot for development platforms in accordance with some embodiments. As will be apparent, other computer system architectures and configurations can be used to provide a bi-directional co-pilot for development platforms. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118). In some embodiments, processor 1102 includes and/or is used to provide bi-directional co-pilot for development platforms.

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data and objects used by the processor 1102 to perform its functions (e.g., programmed instructions). For example, memory 1110 can include any suitable computer-readable storage media, described below, depending on whether, for example, data access needs to be bi-directional or unidirectional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or unidirectionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storage 1112, 1120 generally store additional programming instructions, data, and the like that typically are not in active use by the processor 1102. It will be appreciated that the information retained within mass storage 1112 and 1120 can be incorporated, if needed, in standard fashion as part of memory 110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or tele-communications network using a network connection as shown. For example, through the network interface 1116, the processor 1102 can receive information (e.g., data objects or program instructions) from another network or output infor-mation to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments dis-closed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as micro-phones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer read-able medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer sub-systems. In addition, bus 1114 is illustrative of any interconnection scheme serving to link the subsystems. Other computer architectures having different configurations of subsystems can also be utilized.

The disclosed bi-directional co-pilot facilitates computer programming, and has many advantages compared with conventional techniques. In one aspect, the co-pilot is inter-active and supports interaction with a user and dynamic updates to a corresponding application (e.g., a flow designer). In another aspect, a trained machine learning model receives as input content in the application (e.g., within a page of the follow designer such as code) including metadata and outputs a representation of the code. The co-pilot uses the representation of the code as context, along with user input to come up with a recommendation or an action with respect to application content. In yet another aspect, the co-pilot (stateless) provides an interactive chat with an intermediate format, allowing the co-pilot to be generalized across different applications (e.g., stateful).

Although the foregoing embodiments have been described in some detail for purposes of clarity of under-standing, the invention is not limited to the details provided. There are many alternative ways of implementing the inven-tion. The disclosed embodiments are illustrative and not restrictive.

What is claimed is:

1. A method, comprising:
receiving conversation data that indicates a user requested function, wherein the user requested function is asso-ciated with a workflow;
determining, via a machine learning model, computer instructions corresponding to the user requested func-tion;
determining information associated with the computer instructions not provided by the user requested func-tion;
performing at least one of: determining a placeholder for the information or outputting a request for the infor-mation;
updating the workflow to include the computer instruc-tions corresponding to the user requested function; and
updating the computer instructions corresponding to an edit made directly to the workflow.

2. The method of claim 1, wherein the workflow includes a digitally managed workflow.

3. The method of claim 1, wherein:
the conversation data includes a natural language input; and
the user requested function includes a desired result associated with the workflow.

4. The method of claim 1, wherein the conversation data includes text input.

5. The method of claim 1, wherein the conversation data includes voice input.

6. The method of claim 1, wherein the conversation data is characterized by a conversation between a user and a computer system.

7. The method of claim 1, further comprising using a natural language understanding model to determine a response to the conversation data.

8. The method of claim 7, wherein the natural language understanding model includes a language model.

9. The method of claim 1, wherein determining the computer instructions corresponding to the user requested function includes:
obtaining statements from the machine learning model;
determining at least one parameter specific to the work-flow;

determining an environment in which the statements are to be used; and generating the computer instructions by updating the statements to include the at least one parameter and formatting the statements to be intelligible for the environment.

10. The method of claim 1, wherein updating the workflow includes updating parameters in an action of the workflow based at least on the conversation data.

11. The method of claim 1, further comprising executing the computer instructions to perform the user requested function.

12. The method of claim 1, further comprising:

receiving user input with respect to an element of the workflow;

determining conversation data corresponding to the received user input; and outputting the conversation data corresponding to the received user input.

13. The method of claim 1, further comprising:

using the workflow to receive user input including metadata;

determining a representation of the user input; and outputting the representation of the user input, wherein the representation of the user input is in natural language.

14. The method of claim 1, wherein the conversation data is associated with a conversation with a graphical user interface.

15. The method of claim 1, wherein the conversation data is included in a group of one or more tiles.

16. A system, comprising:

processing circuitry; and memory accessible by the processing circuitry, the memory storing instructions that, when executed by the processing circuitry, cause the processing circuitry to:

receive conversation data that indicates a user requested function, wherein the user requested function is associated with a workflow;

determine, via a machine learning model, computer instructions corresponding to the user requested function;

determine information associated with the computer instructions not provided by the user requested function;

perform at least one of: determining a placeholder for the information or outputting a request for the information;

update the workflow to include the computer instructions corresponding to the user requested function; and update the computer instructions corresponding to an edit made directly to the workflow.

17. The system of claim 16, wherein the workflow includes a digitally managed workflow.

18. The system of claim 16, wherein:

the conversation data includes a natural language input; and the user requested function includes a desired result associated with the workflow.

19. A computer program product embodied in a non-transitory computer readable medium and comprising computer instructions for:

receiving conversation data that indicates a user requested function, wherein the user requested function is associated with a workflow;

determining, via a machine learning model, computer instructions corresponding to the user requested function;

determining information associated with the computer instructions not provided by the user requested function;

performing at least one of: determining a placeholder for the information or outputting a request for the information;

updating the workflow to include the computer instructions corresponding to the user requested function; and updating the computer instructions corresponding to an edit made directly to the workflow.

*   *   *   *   *